W. G. BROWN & J. W. JEDKINS.

Car-Coupling Attachments.

No. 5,587. Reissued Oct. 7, 1873.

Witnesses:

E. Wolff

Sedgwick

Per

Inventor:

W. G. Brown

J. W. Jedkins

Attorneys.

AM. PHOTO-LITHOGRAPHIC CO. N.Y. (OSBORNE'S PROCESS)

UNITED STATES PATENT OFFICE.

WILLIAM G. BROWN AND JAMES W. JEDKINS, OF MONMOUTH, MAINE.

IMPROVEMENT IN CAR-COUPLING ATTACHMENTS.

Specification forming part of Letters Patent No. 135,262, dated January 28, 1873; reissue No. 5,587, dated October 7, 1873; application filed July 23, 1873.

*To all whom it may concern:*

Be it known that we, WILLIAM G. BROWN and JAMES W. JEDKINS, of Monmouth, in the county of Kennebec and State of Maine, have invented an Improvement in Car-Coupling Attachments, of which the following is a full, clear, and exact description, reference being had to the accompanying drawings making part of this specification, in which—

Figure 1:
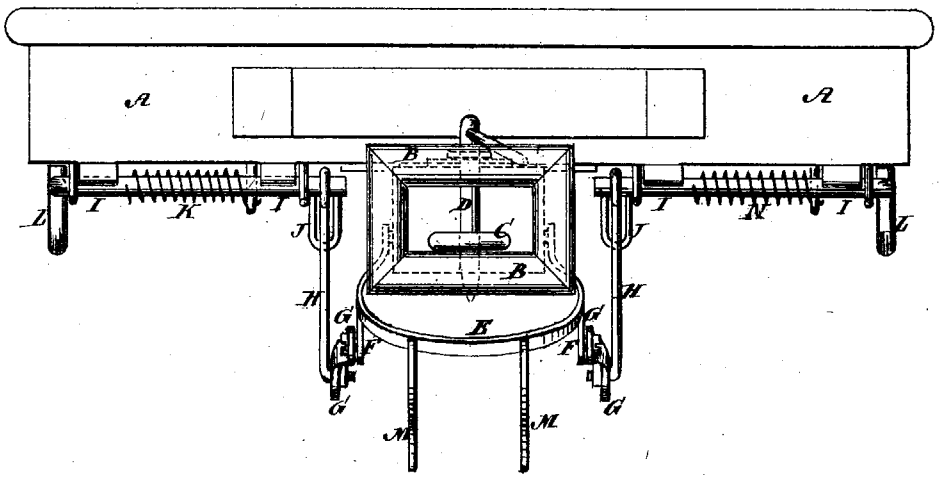
Figure 2:
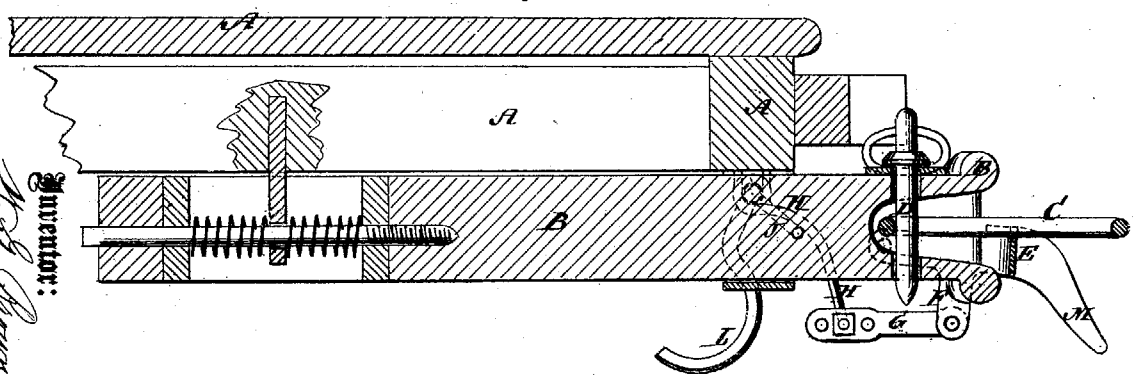

Figure 1 is an end elevation of the lower portion of a car having our improved attachment applied thereto. Fig. 2 is a vertical section through the center of the same.

Our invention has for its object to furnish an improved device, by means of which the operation of coupling cars may be facilitated and rendered perfectly safe, and which shall be inexpensive, readily applied to cars, sure in its operation, not liable to get out of order, and will obviate the necessity of going between the cars when coupling them. The invention consists in a hinged or pivoted bail or lifter, provided with inclined arms, and operated by levers or otherwise, by which means the coupling-link can be raised without going between the cars, so as to insure its entrance into the draw-bar of the adjacent car.

To enable others skilled in the art to understand and use our invention, we will proceed to describe the manner in which we have carried it out.

In the said drawings, A represents the frame-work of a car, and B the draw-bar or bumper, in the forward or outer end of which is formed the cavity to receive the coupling-link C, and through which the coupling-pin D passes in the ordinary manner. E is a bail or lifter, the ends of which are pivoted to the opposite sides of the draw-bar B, and which is made of such a length that it may move up and down in front thereof. To the sides of the bail E are secured, or upon them are formed, downwardly-projecting arms F, to the lower ends of which are pivoted the forward ends of the connecting-bars G, the rear ends of which are pivoted to the lower ends of the levers H, the upper ends of which are each pivoted to a shaft, I. To each shaft I is rigidly attached an arm, J, which projects beneath the lever H to operate it. The shafts I work in bearings attached to the frame A of the car, and are each provided with a coiled spring, K, one end of which is secured to the shaft and the other to the car-frame A, this spring serving to return the shaft to its original position after it has been operated to raise the lifter E. The springs can, however, be dispensed with, if the bail or lifter is sufficiently heavy to descend by its own weight and return the levers to their original positions. Upon the outer ends of the shafts I are formed, or to them are rigidly attached, levers L, one on each side of the car. These levers are curved downward, rearward, and upward, as shown in Fig. 2, so that when the bail E is lowered the levers L may be entirely out of the way, and either one may be conveniently grasped to raise the bail E, and thus elevate the link, so that it will surely enter the draw-bar of the adjacent car. To the forward part or bow of the bail E are attached, or upon it are formed, two arms, M, which project forward and downward, so that, as the cars are run together, should the attendant neglect to lower the bail E, the draw-bar of the adjacent car will strike the arms M and push the bail E down, so that it will not be struck and injured by the draw-bars as they come together. The bars G are made with several holes, so that they may be adjusted according as the draw-bars B project more or less; but, if no adjustment is required, the ends of the levers G and H may be simply hooked together, which will be less expensive. This construction of the operating parts relieves the device from any strain, as the draw-bar moves in starting and stopping the cars.

Instead of pivoting the bail or lifter E to the draw-bar, it may be pivoted at some other convenient point, if preferred.

We do not confine ourselves to the arrangement of levers, &c., shown, for raising the bail or lifter, as any other suitable mechanism, which can be operated without going between the cars, may be employed for raising the lifter E without departing from the spirit of our invention.

What we claim as our invention, and desire to secure by Letters Patent, is—

1. The combination of the draw-bar B, the bail E, provided with inclined arms M and a device for actuating the bail E, to operate together substantially in the manner and for the purpose set forth.

Witness our hands this 17th day of July, A. D. 1873.

WILLIAM G. BROWN.
JAMES W. JEDKINS.

In presence of—
WILLIAM H. H. BROWN,
HOWARD T. WALKER.